United States Patent [19]

Takahashi et al.

[11] Patent Number: 4,593,987

[45] Date of Patent: Jun. 10, 1986

[54] METHOD AND DEVICE FOR AUTOMATIC EXPOSURE CONTROL BY PROGRAMS

[75] Inventors: Yoshiharu Takahashi, Hachioji; Kijiro Suzuki, Hamura, both of Japan

[73] Assignee: Konishiroku Photo Industry Co., Inc., Tokyo, Japan

[21] Appl. No.: 783,826

[22] Filed: Oct. 3, 1985

Related U.S. Application Data

[63] Continuation of Ser. No. 616,267, May 31, 1984, abandoned.

[30] Foreign Application Priority Data

Jun. 10, 1983 [JP] Japan ................... 58-104581

[51] Int. Cl.$^4$ ............................................. G03B 3/10
[52] U.S. Cl. .................... 354/402; 354/403; 354/443; 354/195.11
[58] Field of Search ............... 354/441, 442, 443, 444, 354/445, 403, 195.11, 402, 405

[56] References Cited

U.S. PATENT DOCUMENTS

| | | | |
|---|---|---|---|
| 2,990,758 | 7/1961 | Saver et al. | 354/441 |
| 3,662,659 | 5/1972 | Metzger et al. | 354/443 |
| 3,664,245 | 5/1972 | Bresson et al. | 354/443 |
| 4,274,725 | 6/1981 | Gross | 354/195.11 |
| 4,352,548 | 10/1982 | Toyoda | 354/443 |
| 4,362,372 | 12/1982 | Kiesel | 354/195.11 |
| 4,437,744 | 3/1984 | Terui et al. | 354/442 |
| 4,459,005 | 7/1984 | Harvey | 354/403 |
| 4,473,285 | 9/1984 | Winter | 354/403 |

Primary Examiner—Russell E. Adams
Attorney, Agent, or Firm—Bierman, Peroff and Muserlian

[57] ABSTRACT

A method and device for an automatic exposure control by programs, characterized in that the exposure for an object located at a long distance is controlled by a first automatic exposure control program wherein a stop varies in a range of stop value including open stop value while the exposure for an object located at a close-up distance is controlled by a second automatic exposure control program wherein the stop varies in a range of stop value exceeding a predetermined stop value. The two automatic exposure control programs are selected on the basis of an information on the distance to an object which is set manually, or on the basis of a signal delivered from a range-finder.

12 Claims, 13 Drawing Figures

METHOD AND DEVICE FOR AUTOMATIC EXPOSURE CONTROL BY PROGRAMS

PRIOR APPLICATION

This application is a continuation of U.S. Patent Application Ser. No. 616,267 filed May 31, 1984, now abandoned.

BACKGROUND OF THE INVENTION

1. Field of the Invention

The present invention relates to a method and a device for controlling automatically the exposure in a camera according to a program.

2. Description of the Prior Art

A large number of cameras in which the exposure is controlled automatically according to a program have been used in recent years. Each camera of this kind has an exposure program (mode) incorporated therein beforehand, and a lens stop value and a shutter speed according to the exposure program are adjusted and set automatically in response to the luminance of an object measured by the camera.

In conventional automatic exposure control cameras, the control is performed generally by such a method as described above. Some of these cameras have a plurality of exposure control programs which are used selectively. An invention disclosed in the specification of Japanese Patent Publication No. 125927/1982, for instance, has proposed to photograph on the basis of different exposure programs according to whether an automatic focusing device (AF) is operated or not in a camera. This proposal aims to avoid the employment of a large stop aperture in photographing by AF, and thereby to deepen a field more than a prescribed value so as to reduce the case of an object being out of focus when AF is applied.

Such a proposal for combining AF with automatic exposure control to make use of the depth of field so as to reduce the probability of an object "being out of focus" is still insufficient for the purpose, and thus pictures meeting the demand of photographers to the full have not always been obtained.

SUMMARY OF THE INVENTION

An object of the present invention is to improve such insufficiencies in conventional techniques as described above, furnishing a method and a device for automatic exposure control which enables the full reduction of the probability of faulty pictures.

The object in the broadest sense of the present invention is as described above, which will be described more concretely in the following.

First, the present invention aims to maintain the depth of field appropriately in photographing in general. When a picture is taken by a camera lens of the same focal length and with the same aperture stop, the depth of field is smaller in short-distance photographing than in long-distance photographing. Accordingly, when a deep three-dimensional object located a short way off is photographed, part of the object turns to be out of focus. When a group of people located a short way off is photographed, for instance, the people in the rear row are out of focus if the camera with large aperture stop is focused on the people in the front row. The present invention aims to furnish a method and a device for automatic exposure control which are free from such a fault.

Secondly, the present invention aims to furnish the method and device for automatic exposure control which are fit to be incorporated in a built-in rangefinder type AF camera. In conventional AF cameras of this type, lens stop positions and the number thereof are determined generally from the depth of field which is calculated from the focal length of a camera lens, a full-aperture and a permissable circle of "out of focus". According to this method, a large number of stop positions are required on the short-distance side, and the number of stop positions in the range from 1 to 2 meters, for instance, is the same with the number thereof in the range from 2 meters to $\infty$. Furthermore, the number of stop positions in the range from 0.5 to 1 meter is also the same with the number thereof in the range from 1 meter to $\infty$, and thus the control of the lens stop positions on the short-distance side is accompanied by large difficulties.

This is because the conventional built-in rangefinder type cameras take an information on a distance to an object quite separately from an information on the luminance of the object. In these cameras, an exposure program is set only on the basis of the luminance of the object, and accordingly the stop value of a camera lens in a low-luminance area is set in the exposure program wherein an open stop is used, which causes said difficulties.

The object of the present invention as described above is attained basically by providing a camera with a plurality of automatic exposure programs different in the maximum stop aperture from each other, by controlling the exposure for a long-distance object on the basis of an automatic exposure program wherein a stop aperture varies to a large extent, and by controlling the exposure for a short-distance object on the basis of an automatic exposure program wherein the stop aperture varies in a small range.

Based on such automatic exposure programs, the probability of a faulty, so-called "out of focus" picture being produced in short-distance photographing is reduced by selecting a small stop with a large focal depth for a short-distance field with a small depth, while a picture of excellent quality can be obtained in long-distance photographing by utilizing the performance of a lens at the maximum.

Moreover, since the short-distance photographing is performed in an area wherein the focal depth is large, as described above, the exactness in focusing is not required so much, which facilitates the focusing consequently.

This effect facilitates a focusing operation literally when the focusing is performed manually, and makes it possible to relax the strictness in the precision of an automatic focusing device when the focusing is performed automatically according to a signal from a range finding device.

As is mentioned above, said automatic exposure programs are selected according to an object-distance signal taken from the position of a focus lens, or from the movement of a close-up lens in and out of a photographing optical system, in the case of manual focusing. In the case of automatic focusing, said programs can be selected also according to the signal from the rangefinder, and the signal for selecting the programs can also be taken from the position of the lens.

Said automatic exposure programs in plural may be stored in a memory, for instance, to be read therefrom selectively according to the object-distance signal. Otherwise, a permissible minimum stop value may be selected, according to an object-distance information, out of automatic exposure control programs, which are prepared in four in appearance.

The above automatic exposure control programs should not be understood simply as programs stored in a memory of a control circuit, but should be understood as programs employed in a so-called "automatic exposure control by programs".

In other words, the automatic exposure control programs in the present invention should be understood as a method of automatic exposure control wherein the combination of a stop value with a shutter speed is fixed and can not be varied arbitrarily by an operation of a photographer.

Such a method of automatic exposure control as described below, for instance, can be mentioned as the automatic exposure control programs in the present invention. A stop-shutter blade whereby an exposure is adjusted is provided with a so-called sub-stop for adjusting a quantity of incident light into a photometric element for automatic exposure control. Said blade is moved by releasing a shutter, and the sub-stop opens as a stop opens. When the quantity of incident light into the photometric element reaches a prescribed value, a magnet is made to operate to set the blade in a shutting operation. Said prescribed value varies according to an information on a distance to an object. By this method, the automatic exposure control programs are selected according to said information.

Other objects and features of the present invention will be made apparent hereunder with the description of the drawings.

DESCRIPTION OF THE PREFERRED EMBODIMENTS

Focusing in a camera is performed by transferring a camera lens in relation to the surface of a film in either case wherein it is performed manually or by AF. The camera lens is transferred forward and backward by rotating a helicoid and the camera lens relatively to each other, or by moving this lens linearly. The focal position of an object (an information on distance to an object) can be read, accordingly, from the position of the camera lens transferred in the forward-backward direction and focused, or from the angular positions of the helicoid and the camera lens which are rotated.

Figure 1A:
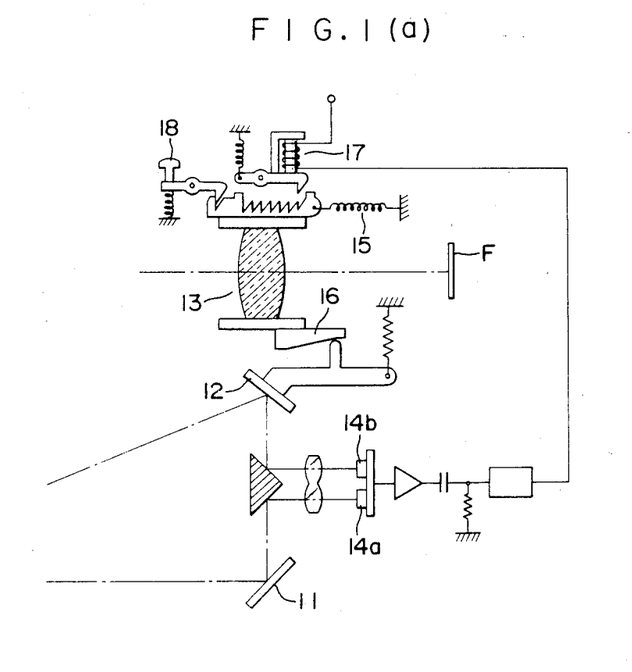
FIG. 1(a) shows a schematic structure of an AF camera wherein a coincidence type rangefinder is used.
Figure 1B:
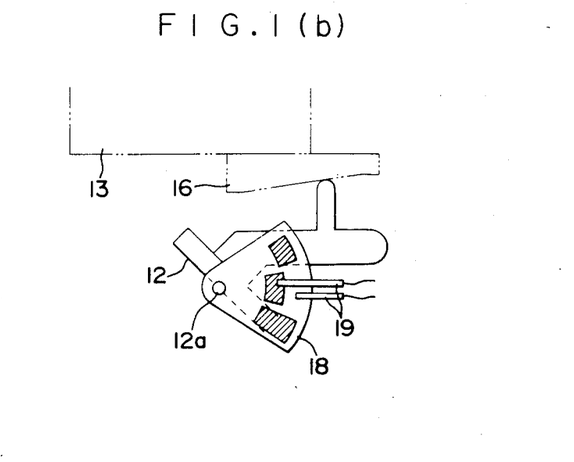
FIG. 1(b) is an enlarged view of the principal part of this camera.

The present invention is applied to a nonfixed focus camera irrespective of whether the camera is of a manual type or an AF type. First, a description will be made on one example of an AF camera with reference to FIG. 1.

FIG. 1(a) illustrates the AF camera wherein a rangefinder of a coincidence type is used. A mirror on one side is a fixed mirror 11, while a mirror on the other side is a movable mirror 12 which is rotated in gearing with the movement of a camera lens 13. An optical image obtained by the fixed mirror 11 and an optical image obtained by the movable mirror 12 are forcused separately on photoelectric elements 14a and 14b which are provided in a pair on an IC substrate. The image on the photoelectric element 14a is fixed, while the image obtained by the movable mirror 12 is moved on the photoelectric element 14b. The photoelectric elements 14a and 14b are divided in plural respectively, and photocurrents from separate photoelectric elements forming pairs in their relative positional relationships to an object are compared with each other during the rotation of the movable mirror 12.

In the meantime, the camera lens 13 facing a film F is moved by a lens-controlling spring 15 which is energized. The camera lens 13 is provided with a scan cam 16, and one end of the above movable mirror 12 is in contact with this scan cam 16. The distance to the object found by the mirrors 11 and 12 of a rangefinder is in accord with the focal position of the camera lens 13.

Since the focal position of the object obtained by the camera lens 13 is interrelated and in accord with the distance to the object found by the rangefinder of the coincidence type, the movable mirror 12 of the rangefinder is rotated according to a change in the distance from close-up distance to infinity simultaneously when the focal position of the camera lens 13 is moved by the controlling spring 15 from a close-up distance point to a point of infinity by pushing a release button 18, for instance. When the photocurrents from the photoelectric elements 14a and 14b accord with each other, a lens stopping solenoid 17 is operated to stop the camera lens 13, and thereby AF is performed for photographing.

In this constitution, the movable mirror 12 moving around the center 12a of the movement as range finding is performed is provided with a terminal plate 18 as shown in FIG. 1(b), which is made to be in contact with a fixed contact piece 19 provided on the camera side. Then the focusing state of a photographing optical system can be taken out by the terminal plate 18 and the contact piece 19, and thus this mirror, as a detecting means, can detect said focusing state.

FIG. 2 shows another AF camera, which is an AF camera of an active system. FIG. 2(a) illustrates that infrared rays emitted from an infrared ray emitting element (LS) provided in the camera through a collimator lens $L_1$ are reflected by an object O and formed into an image on position sensitive device PSD by a lens $L_2$ of a light-receiving unit. FIGS. 2(b) and 2(c) are conceptional views of the position sensitive device PSD which generates an electric signal corresponding to the position of the center of the luminance of an optical image. FIG. 2(b) is a sectional view of PSD, while FIG. 2(c) is a top view thereof. Electrodes $P_1$ and $P_2$ are provided on the opposite ends of a light-receiving surface 21 of PSD, while an electrode $P_3$ is provided on the back surface thereof. Now when a light spot L falls on one point in the light-receiving surface of PSD in FIG. 2(b), a positive and negative electron-hole couple is generated in a depletion layer (I layer), and electrons flow to an N layer, while a hole flows to a P layer. The electrons having arrived at the N layer flow further, as they are, through the electrode $P_3$.

On the other hand, the hole having reached the P layer is required to flow further along the P layer so as for it to reach the electrodes. Since the P layer has an electric resistance, however, output currents $I_1$ and $I_2$ from the electrodes $P_1$ and $P_2$ do not take the same values, and are distributed proportionally by average resistances $R_1$ and $R_2$. Thus, the position of the light spot L can be found from the difference between the output currents $I_1$ and $I_2$ distributed proportionally by the resistances $R_1$ and $R_2$.

Figure 2A:
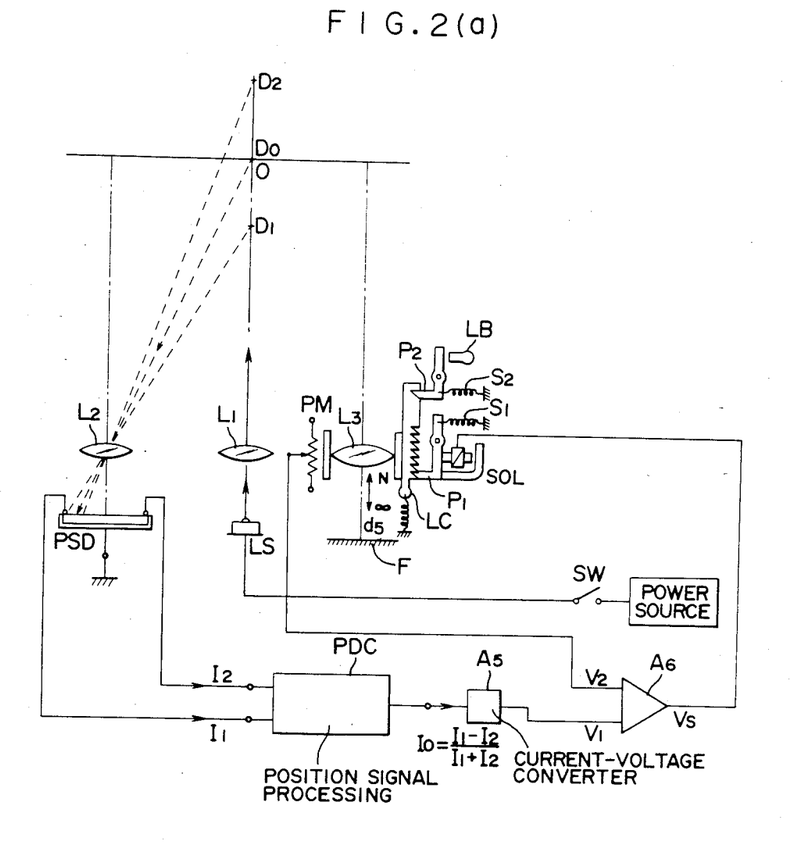
FIG. 2(a) shows a schematic structure of an active type AF camera.
Figure 2B:
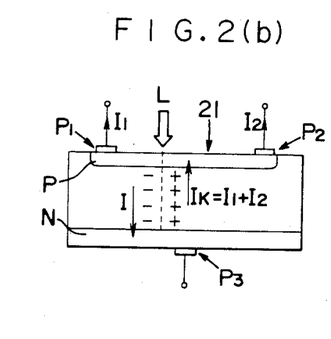
FIGS. 2(b) and (c) are conceptional views of an image position detector.
Figure 2C:
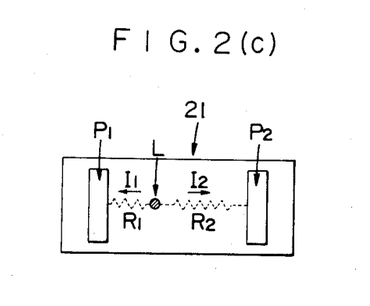
Figure 2D:
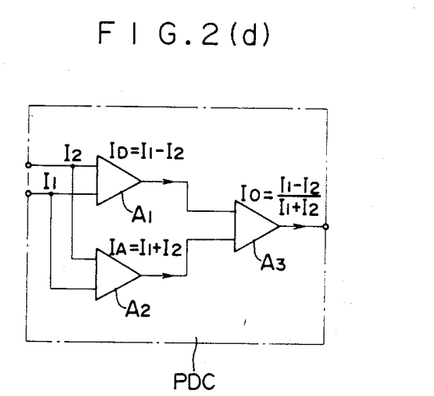
FIG. 2(d) shows a position detection processing circuit.
Figure 2E:
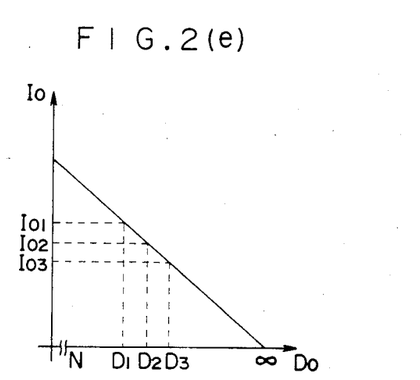
FIG. 2(e) shows the relationship between a division output and a distance to an object.

A position detection processing circuit PDC shown in FIG. 2(d) processes the output currents $I_1$ and $I_2$ by an arithmetic operation and generates an electric signal corresponding to the distance $D_0$ to the object O. The position detection processing circuit PDC is composed of a differential amplifier $A_1$, an addition amplifier $A_2$ and a division amplifier $A_3$, and the output currents $I_1$ and $I_2$ from the image position detector PSD are processed by dividing a differential current $I_D$ ($=I_1-I_2$: positional output) from the differential amplifier $A_1$ by an added current $I_A$ ($=I_1+I_2$: total photocurrent) from the addition amplifier $A_2$. Namely, a divided output current $I_0$ ($=I_D/I_A$) is generated by the division amplifier $A_3$ in this circuit. By dividing $I_D$ by $I_A$, a constant positional signal $I_0$ is generated without being affected by the intensity of a reflected light from the object, and thereby the amount of shift of the center of the luminance can be found accurately. Since the division output $I_0$ is a signal related to an amount of movement of an image on the image position detector PSD, the distance $D_0$ to the object can be determined from the division output $I_0$ as shown in FIG. 2(e).

When a release button LB is pushed in FIG. 2(a), pawls $P_1$ and $P_2$ are disengaged from the lens drum of the camera lens $L_3$, the focal position of the lens is moved from the close-up distance side N to the long-distance side ∞, and a light is projected from the light source LS toward the object through an optical system. The division output $I_0$ from the position detection processing circuit PDC, which is described in the above, is turned into a voltage $V_1$ corresponding to the distance $D_0$ to the object by a current-voltage converter $A_5$. As for a voltage $V_2$ corresponding to the position of the lens drum of the camera lens $L_3$, the difference between the voltages $V_1$ and $V_2$ is delivered as a voltage $V_S$ from a differential amplifier $A_6$. When the focal position of the camera lens $L_3$ turns to be the distance $D_0$, the voltage $V_2$ coincides with the voltage $V_1$, and thereby the output $V_S$ from the differential amplifier $A_6$ becomes zero. When the output $V_S$ turns to be zero, a lens stopping solenoid SOL is released from its attracted state, the pawl $P_1$ is made to jump into a rack LC by the force $S_1$ of a spring, the camera lens $L_3$ is thereby fixed at a position corresponding to the distance $D_0$, and thus automatic focusing is performed.

In the present embodiment, the output currents $I_1$ and $I_2$ from the position detector PSD, or the divided output current $I_0$ from the position detection processing circuit, can be obtained as a signal obtained by a means for measuring the distance to an object.

According to the present invention relating to a method and a device for controlling the exposure automatically on the basis of programs, different exposure control programs are selected on the basis of an information on the distance to an object, and, as is apparent from the above embodiment, the information on the distance is obtained for a camera from an information on the distance to the object set manually (1), by a means of a photographing optical system for detecting the state of focus (2), and from a signal delivered from a rangefinder (3), etc.

Now, a description will be made on an AF camera to which the present invention is adapted.

Figure 3:
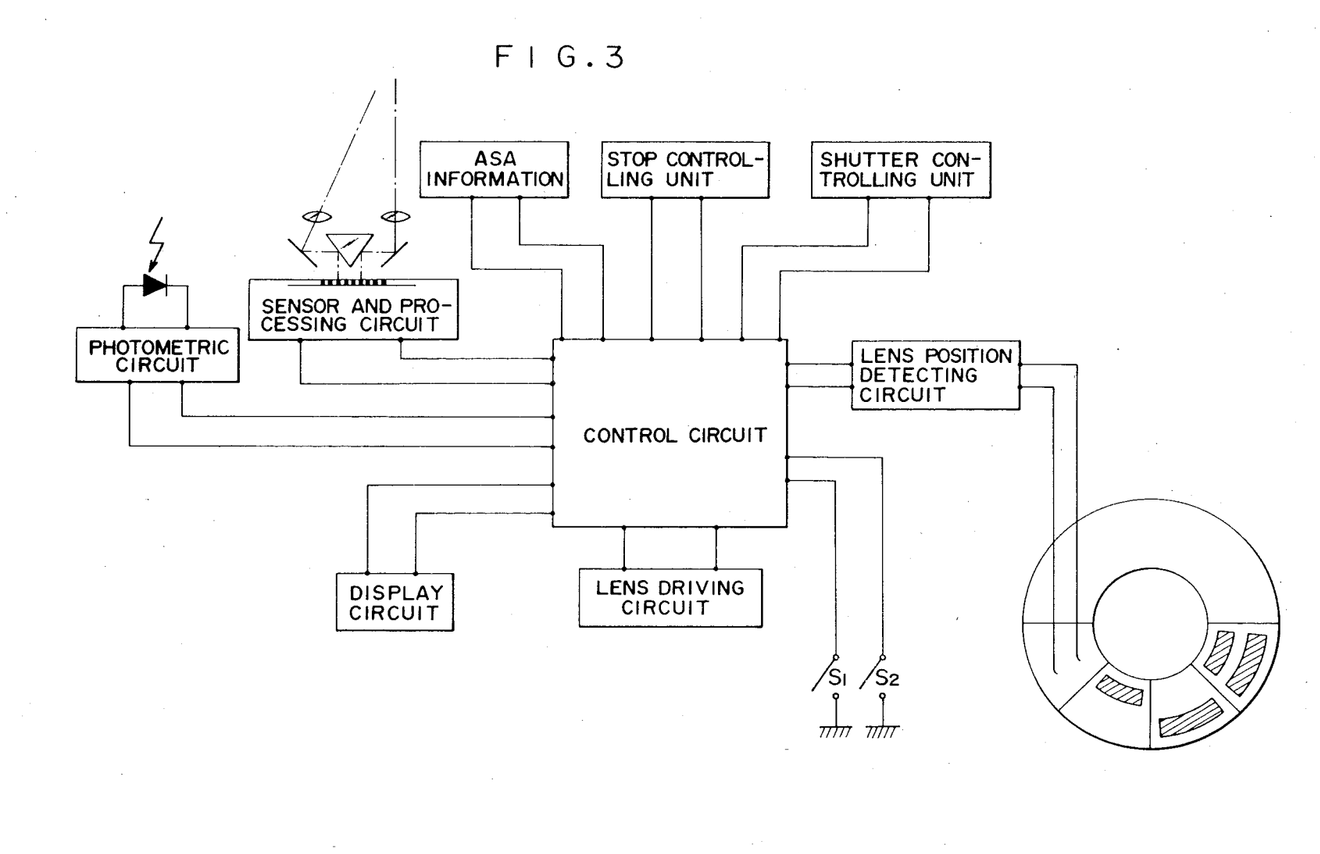
FIG. 3 shows a diagram of a control circuit of the present invention.
Figure 4:
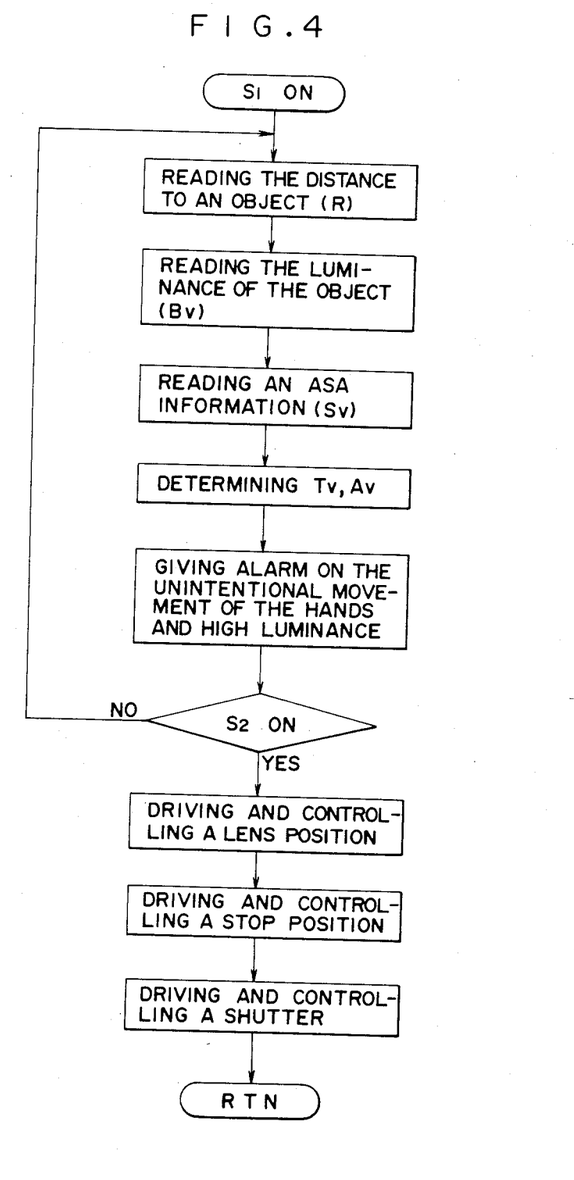
FIG. 4 shows a fundamental flow chart of steps to the end of photographing.

FIG. 3 is a diagram of a control circuit, and FIG. 4 shows a fundamental flow chart of steps to the end of photographing. The shutter button is herein a two-stage switch consisting of a first stage $S_1$ and a second stage $S_2$. With the first stroke depression ($S_1$ ON) of the shutter button, a power source is turned ON, the distance to an object and the luminance of the object are measured, and based on the informations thereon, a stop and a shutter speed fitted for the luminance of the object and the distance thereto set on the programs incorporated in said camera according to the present invention, which will be described later, are selected, while an alarm on high luminance or an alarm on the unintentional movement of the hands is given when these informations are found to be beyond the set limits.

With the second stroke depression ($S_2$ ON) of the shutter button, a lens is moved to a focal position, and then the exposure is performed at a selected stop position and a selected shutter speed.

Figure 5:
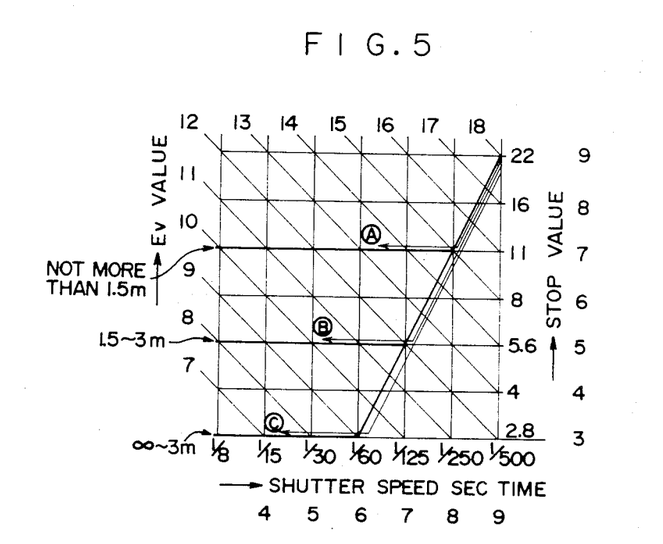
FIG. 5 shows one embodiment of exposure programs.
Figure 6:
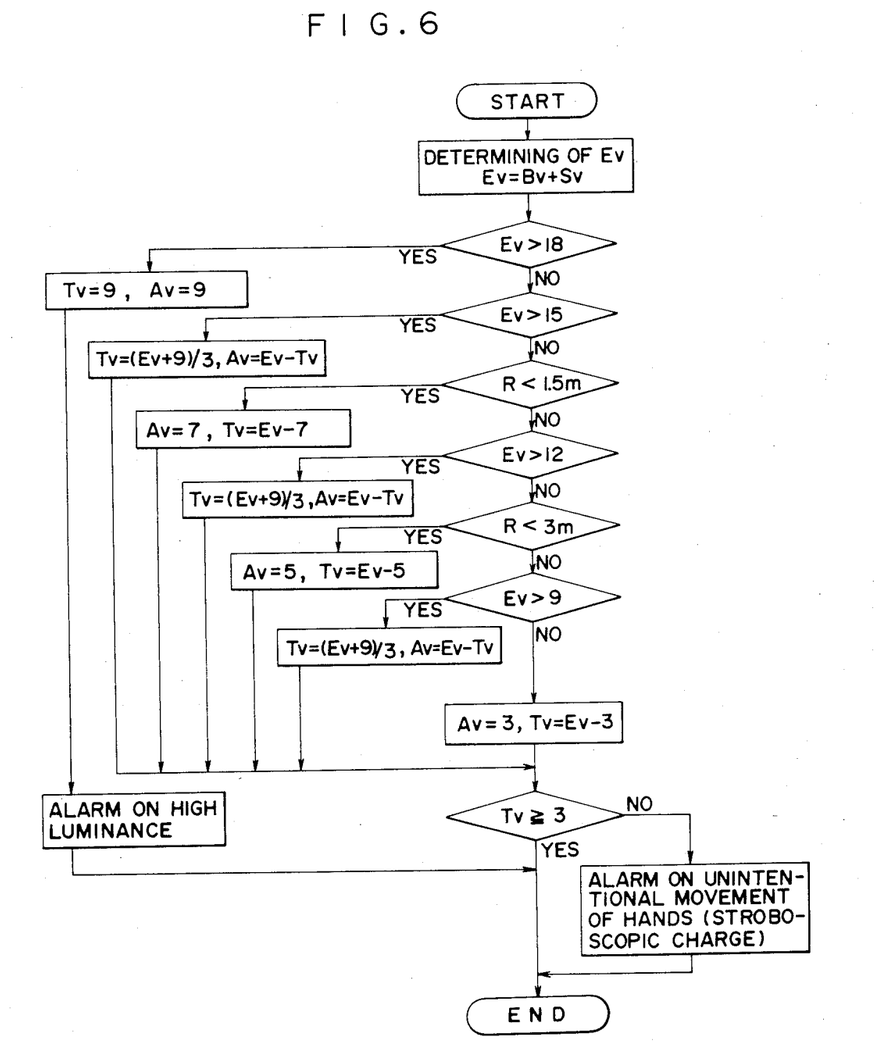
FIGS. 6 and 8 are flow charts thereof.

FIG. 5 shows one embodiment of exposure programs, and FIG. 6 is a flow chart of steps for selecting a stop and a shutter speed according to the exposure programs of FIG. 5 on the basis of an information on the distance to an obect and an exposure value $E_V$ value.

According to these figures, the relationship between a stop value and aperture value $A_V$ is shown

| F | 1 | 1.4 | 2 | 2.8 | 4 | 5.6 |
|---|---|-----|---|-----|---|-----|
| $A_V$ | 0 | 1 | 2 | 3 | 4 | 5 |

The relationship between the shutter speed and time value $T_V$ is as follows:

| speed (sec.) | 1 | ½ | ¼ | ⅛ | 1/15 | 1/30 |
|---|---|---|---|---|------|------|
| $T_V$ | 0 | 1 | 2 | 3 | 4 | 5 |

The luminance ($B_V$) and the film sensitivity ($S_V$) are in the following relationship.

$$E_V = A_V + T_V = B_V + S_V$$

When the distance to an object is not more than 1.5 m, for instance, the exposure program is found on a program line A, and a stop value in a range from F 22 to F 11 is selected corresponding to the luminance of the object, with the minimum value of F 11. When a photosensitive material of ASA/ISO 100 is employed, for instance, the condition of exposure is 1/500 sec at F 22 on light value $L_V$ 18, and 1/15 sec at F 11 on $L_V$ 11.

When the distance to the object is 1.5 to 3 m, the exposure program is found on a program line B, and the stop value in a range from F 22 to F 5.6, the minimum, is selected corresponding to the luminance of the object. When the photosensitive material of ASA/ISO 100 is employed, for instance, the condition of exposure is 1/500 sec at F 22 on $L_V 18$, and 1/60 sec at F 5.6 on $L_V$ 11. When the distance to the object is ∞ to 3 m, the exposure program is found likewise on a program line C, and the F number and the shutter speed are altered corresponding to the luminance of the object.

Figure 7:
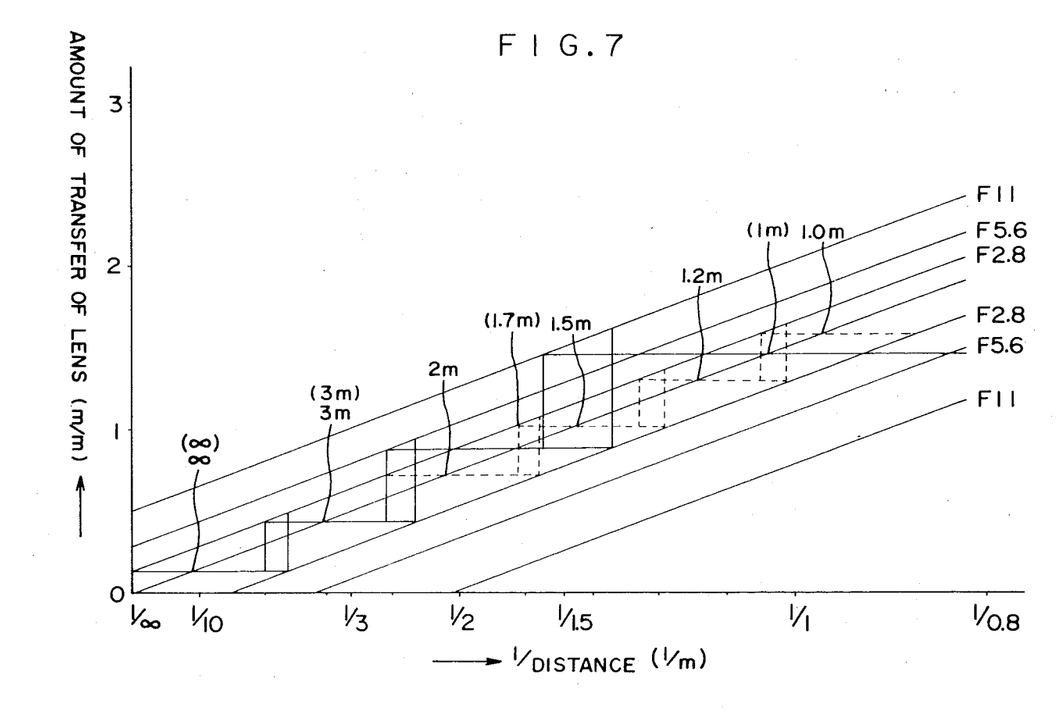
FIG. 7 shows the relationship between a lens stop position of a camera and the depth of field thereof.

By using such a multiprogram corresponding to the distance to an object, the depth of field in the close-up distance is increased sharply, and it becomes possible to reduce the number of lens stop positions on the close-up distance side in AF. FIG. 7 shows the relationship between the lens stop position and the depth of field under the condition of the focal length of a camera lens f=38 mm and the opening number 2.8. If a permissible circle of "out of focus" is $d_1 = 0.05$ mm (longdistance side) and $d_2 = 0.07$ mm (close-up distance side), at least six stop positions of 1.0 m, 1.2 m, 2 m, 3 m and ∞ indicated by dotted lines are usually required for a lens. By using the exposure program shown in FIG. 5, the stop positions can be reduced to four, at the maximum, of 1 m, 1.7 m, 3 m and ∞ indicated by solid lines.

According to the present invention, the number of lens stop positions on the close-up distance side can be reduced in this way, and when the stop positions are left in the same number, the shortest range of photographing can be set nearer. Moreover, the present invention has a number of other advantages, such as an improvement in the quality of a picture of a field in front and the rear of an object positioned at the close-up distance, which is attained by controlling the stop of a camera lens.

Figure 8:
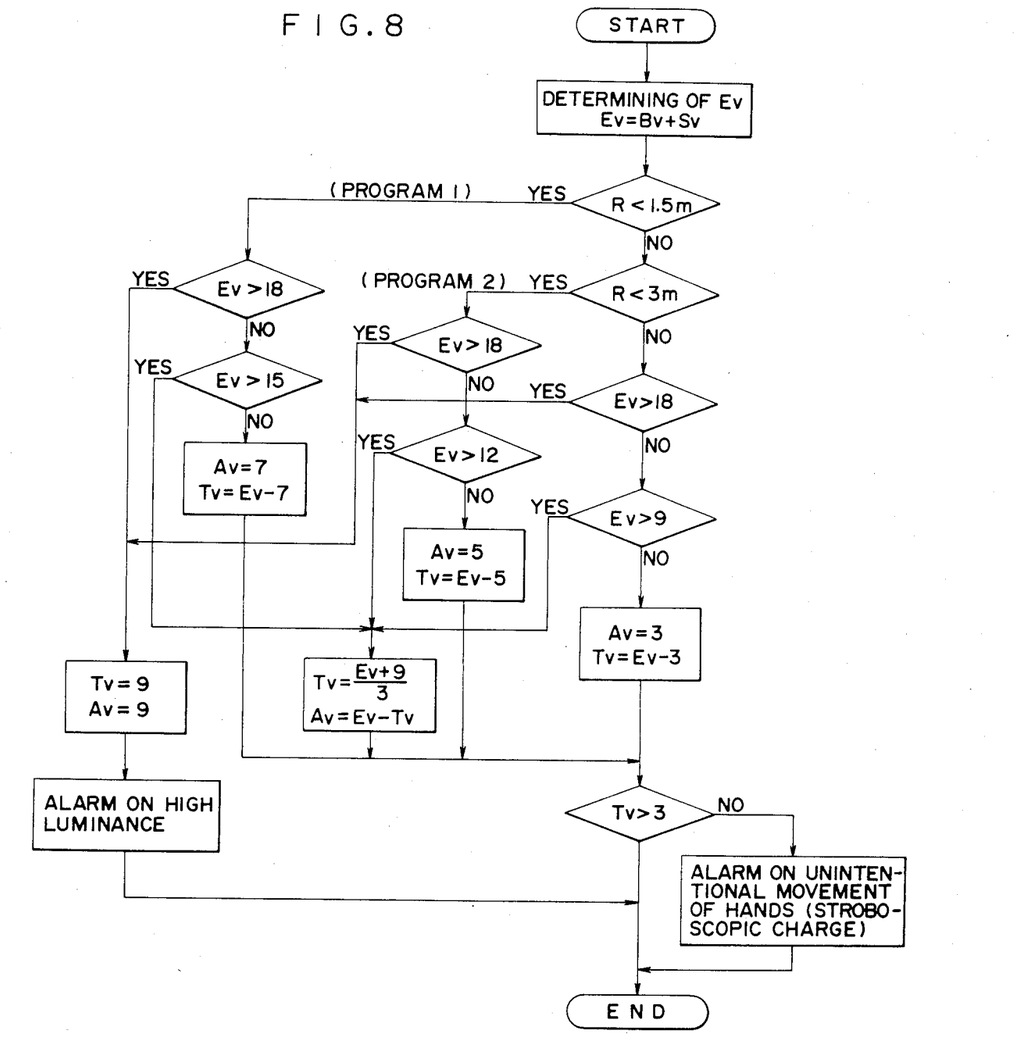

FIG. 8 is, like FIG. 6, a flow chart of steps taken on the basis of $E_V$ values, which is one embodiment of the present invention. When the distance to an object is not more than 1.5 m, the exposure is controlled automatically according to a program 1 wherein a stop varies in a relatively small range of stop aperture. When the distance to the object is within a range from 1.5 m to 3 m, the automatic exposure control is performed according to a program 2 wherein the stop varies in an intermediate range of stop aperture. Moreover, when the distance is not less than 3 m, said control is performed according to a program 3 wherein the stop varies in a relatively large range of stop aperture.

Such a multiprogram corresponding to the distance to an object is adaptable both for an AF camera and for a camera wherein a distance adjustment is performed manually, and the number of exposure programs is required to be only two, at least. The present invention includes all methods and devices wherein an exposure control is performed on the basis of said exposure programs corresponding to the distance to an object by using an automatic exposure control program wherein the stop varies in a range of stop value including open stop value in the case when an object is positioned at a long distance, and by using an automatic exposure control program wherein the stop varies in a range of stop value exceeding a predetermined stop value when the object is positioned at a close distance, irrespective of the way wherein an information on the distance is taken.

A camera in which the present invention is incorporated has a very favorable characteristic for designing and manufacturing an AF camera, having also an excellent characteristic in maintaining the depth of field appropriately in general photographing for cameras in general.

What is claimed is:

1. In a method of automatic exposure control of a camera having a lens, said lens being movable to focus on an object to be photographed, the improvement which comprises selectively controlling the exposure according to the distance of the object to be photographed from the lens by at least a first automatic exposure controlling program and a second automatic exposure controlling program, a maximum stop value permitted by the second program being smaller than a maximum stop value permitted by the first program, said second program controlling the exposure when an object is positioned near said lens, said first program controlling the exposure when said object is positioned far from said lens.

2. The method of claim 1 wherein said first and said second programs are selected based on information as to distance to said object which is set manually.

3. The method of claim 1 wherein said first and said second programs are selected based on a signal from a range finder.

4. The method of claim 1 wherein there is also provided at least a third automatic exposure controlling program, a maximum stop value permitted by the third program being intermediate of said maximum stop values of said first and said second programs, said third program controlling the exposure when said object is positioned at an intermediate distance from said lens.

5. A device for automatic exposure control by programs of a camera comprising
   (a) means for determining the brightness of an object to be photographed,
   (b) a first automatic exposure control program adapted to control stop values and limit them to a 1st maximum,
   (c) a second automatic exposure control program adapted to control stop values and limit them to a 2nd maximum which is smaller than than 1st maximum,
   (d) means for detecting the focus of said camera,
   (e) means for selecting said first or said second program comprising means for detecting a signal from said focus detecting means, whereby exposure is controlled by said first program if said camera is focused on said object which is far from said lens; and by said second program if said camera is focused on said object which is near said lens.

6. The device of claim 5 further comprising at least a third automatic exposure control program adapted to permit a maximum stop value which is intermediate of the maximum stop values of said first and said second programs, said means for selecting being capable of selecting among said programs whereby, if said camera is focused on said object which is at an intermediate distance from said lens, said third program is selected.

7. The device of claim 5 wherein said camera is provided with an optical system having a plurality of limited ranges of focus, said focus detecting means adapted to deliver a different signal for each of said ranges, each of said programs corresponding to one of said ranges and selectable based thereon.

8. A device for automatic exposure control by programs of a camera comprising
   (a) means for determining the brightness of an object to be photographed,
   (b) a first automatic exposure control program adapted to control stop values and limit them to a 1st maximum, (c) a second automatic exposure program adapted to control stop values and limit them to a 2nd maximum which is smaller than the 1st maximum,
(d) means for finding the distance to said object,
(e) means for selecting said first or said second program combining means for detecting a signal from said distance finding means whereby exposure is controlled by said first program if said distance is long and by said second program if said distance is short.

9. The device of claim 8 further comprising at least a third automatic exposure control program adapted to permit a maximum stop value which is intermediate of the maximum stop values of said first and said second programs, said means for selecting being capable of selecting among said programs whereby, if the object is at an intermediate distance from said lens, said third program is selected.

10. The device of claim 9 wherein said distance finding means is adapted to deliver a plurality of range-finding signals, each corresponding to a predetermined range of distances to said object, each of said programs corresponding to one of said plurality.

11. The method of claim 4 wherein the range of stop values controlled according to at least three programs are different from each other.

12. The device according to claim 9 wherein said distance finding means delivers a plurality of signals, each corresponding to one predetermined range of distance to said object, each of said programs corresponding to one said range and being selected in response to one of said signals.

* * * * *